US011003259B2

United States Patent
Zaitsev et al.

(10) Patent No.: US 11,003,259 B2
(45) Date of Patent: May 11, 2021

(54) MODIFIER KEY INPUT ON A SOFT KEYBOARD USING PEN INPUT

(71) Applicant: Lenovo (Singapore) Pte. Ltd., Singapore (SG)

(72) Inventors: Grigori Zaitsev, Durham, NC (US); Russell Speight VanBlon, Raleigh, NC (US); Joshua Neil Novak, Wake Forest, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 6 days.

(21) Appl. No.: 14/633,927

(22) Filed: Feb. 27, 2015

(65) Prior Publication Data

US 2016/0252983 A1  Sep. 1, 2016

(51) Int. Cl.
*G06F 3/0354* (2013.01)
*G06F 3/038* (2013.01)
*G06F 3/023* (2006.01)
*G06F 3/0488* (2013.01)

(52) U.S. Cl.
CPC .......... *G06F 3/03545* (2013.01); *G06F 3/023* (2013.01); *G06F 3/038* (2013.01); *G06F 3/04883* (2013.01); *G06F 3/04886* (2013.01)

(58) Field of Classification Search
CPC ....... G06F 3/0481; G06F 3/021; G06F 3/0416
See application file for complete search history.

(56) References Cited

U.S. PATENT DOCUMENTS

| 5,603,053 | A | * | 2/1997 | Gough | ................. | G06F 3/0481 345/156 |
| 6,462,760 | B1 | * | 10/2002 | Cox, Jr. | ................. | G06F 3/021 715/708 |
| 2009/0167702 | A1 | * | 7/2009 | Nurmi | ................. | G06F 3/0346 345/173 |
| 2012/0068964 | A1 | * | 3/2012 | Wright | ............... | G06F 3/03545 345/174 |
| 2014/0329593 | A1 | * | 11/2014 | Akkarakaran | .......... | A63F 13/42 463/31 |

* cited by examiner

*Primary Examiner* — Sepehr Azari
(74) *Attorney, Agent, or Firm* — Ference & Associates LLC

(57) ABSTRACT

One embodiment provides a method, including: accepting, at an input surface, pen input; determining, using a processor of an electronic device, a modifier key characteristic of the pen input; and executing, using the processor, a modifier key function associated with the pen input. Other embodiments are described and claimed.

20 Claims, 3 Drawing Sheets

MODIFIER KEY INPUT ON A SOFT KEYBOARD USING PEN INPUT

BACKGROUND

Information handling devices ("devices"), for example cell phones, smart phones, tablet devices, laptop computers, and the like permit users to input handwriting, make selections, and provide other inputs using a finger tip or pen/stylus. This allows users to work more naturally with the device.

In some devices (e.g., tablet computing devices) the user relies primarily on a touch screen or "soft" keyboard (on-screen keyboard, OSK), which may be used to provide key strokes. In some devices, an input method editor (IME) may be used to interpret handwritten ink strokes as input characters in addition to a more conventional soft keyboard. In still other devices (e.g., tablet with detachable keyboard, laptop computer, etc.) a pen or stylus may also be utilized to interface with the device, e.g., in connection with a digitizer or touch screen responsive to pen or touch input, even though other input modes are available (e.g., physical keyboard).

BRIEF SUMMARY

In summary, one aspect provides a method, comprising: accepting, at an input surface, pen input; determining, using a processor of an electronic device, a modifier key characteristic of the pen input; and executing, using the processor, a modifier key function associated with the pen input.

Another aspect provides an electronic device, comprising: an input surface; a processor operatively coupled to the input surface; and a memory that stores instructions executable by the processor to: accept, at the input surface, pen input; determine a modifier key characteristic of the pen input; and execute a modifier key function associated with the pen input.

A further aspect provides a product, comprising: a storage device having code stored therewith, the code being executable by a processor of an electronic device and comprising: code that accepts, from an input surface, pen input; code that determines a modifier key characteristic of the pen input; and code that executes a modifier key function associated with the pen input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
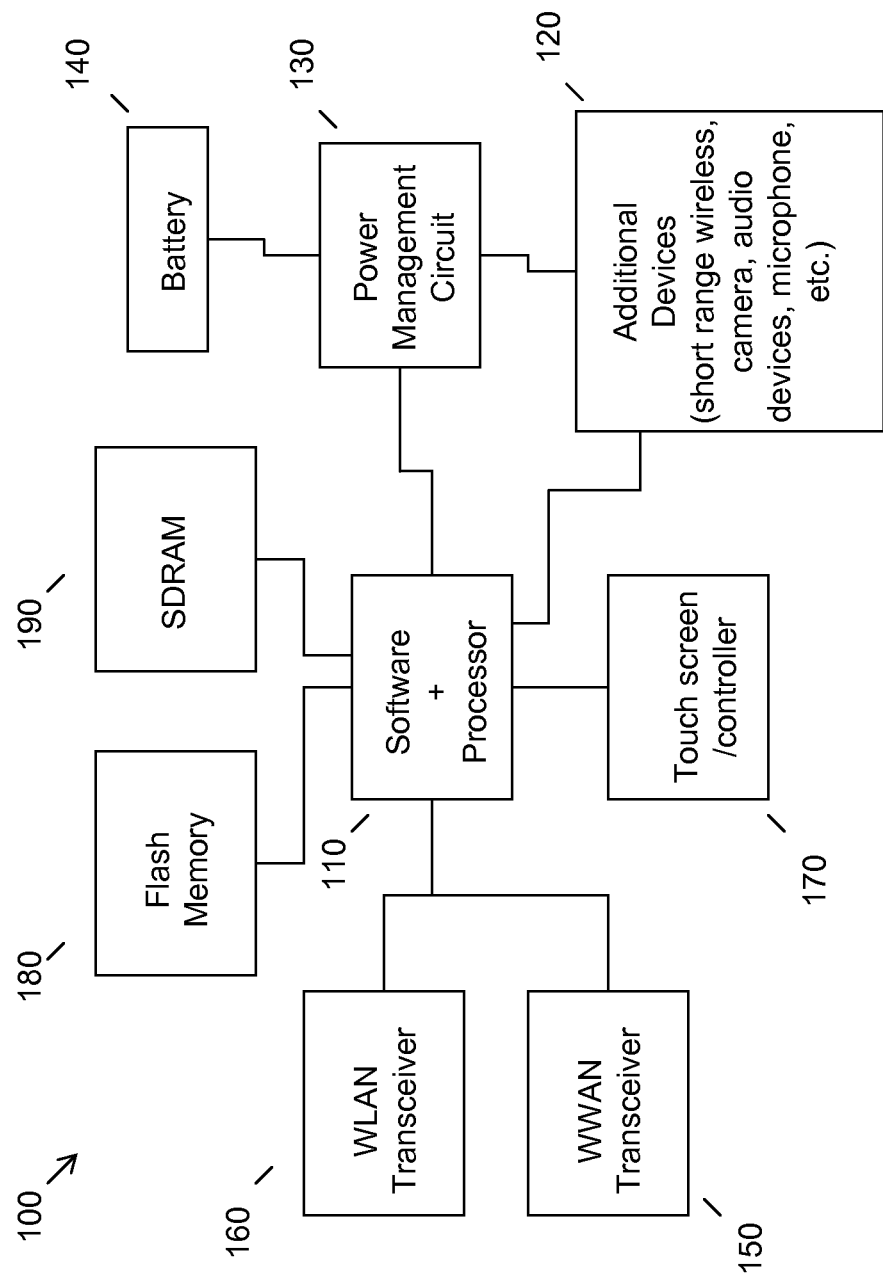
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Soft keyboards, to the extent possible, attempt to mimic the functionality of physical keyboards. Keyboard shortcuts or control key inputs (e.g., Ctrl+C, Ctrl+Z, etc.) are possible using two handed input to physical keyboards. "Control key" is used herein to refer to a command or indication for an altered-function of a key, e.g., via use of an "Alt," a "Shift," or other modifier key. On tablets or other systems with no physical keyboard, however, such shortcut inputs are difficult to accomplish, if possible at all.

In one approach, on-screen keyboards (OSK's) are provided with a "sticky" key. For example, a soft keyboard permits an upper case letter entry by providing an additional soft keyboard input, e.g., first activating a shift key and thereafter providing input to the key of choice. This method lengthens input by one click and consumes display space by using the OSK. In another approach, multi-point touch inputs are supported by the OSK. This method may require both hands to be used, which might be unacceptable when system is used in certain contexts or modes (e.g., in a handheld mode). This technique also consumes display space for the presentation of the OSK.

These and other conventional approaches to handling key inputs, and thus might be put to use to implement control key inputs or "shortcuts" are cumbersome and tend to make users not attempt to perform certain control functions with a soft keyboard, reducing the OSK's and the device's functionality and usefulness. As such, a technical problem is found in that input methods have not been provided that take advantage of a pen input variable, particularly that of an active pen or stylus, when implementing input functionality for electronic devices.

An embodiment uses a pen input variable to refine the type of inputs which a user may make. This greatly expands the functionality of the input mode, e.g., an OSK, and furthermore allows the user to provide complex inputs without resorting to special sticky keys, multi-touch or two handed inputs, etc. Rather, an embodiment provides an efficient and user friendly additional functionality such that user may realize the full potential of control or other shortcut keys, even if using an OSK. As will be come more apparent throughout, these features improve the operation of the device by allowing the OSK to more closely resemble the functionality of the physical keyboard, for which many programs and applications were originally designed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering, which may include programming such as described herein for processing pen input and analysis of the same using various programs such as grammar checking programs, natural language processing programs, pattern or expression identification programs, as well as analyzing if the pen input includes a control key characteristic, as further described herein. System 100 also typically includes various memory devices, for example flash memory 180 and SDRAM 190.

Figure 2:
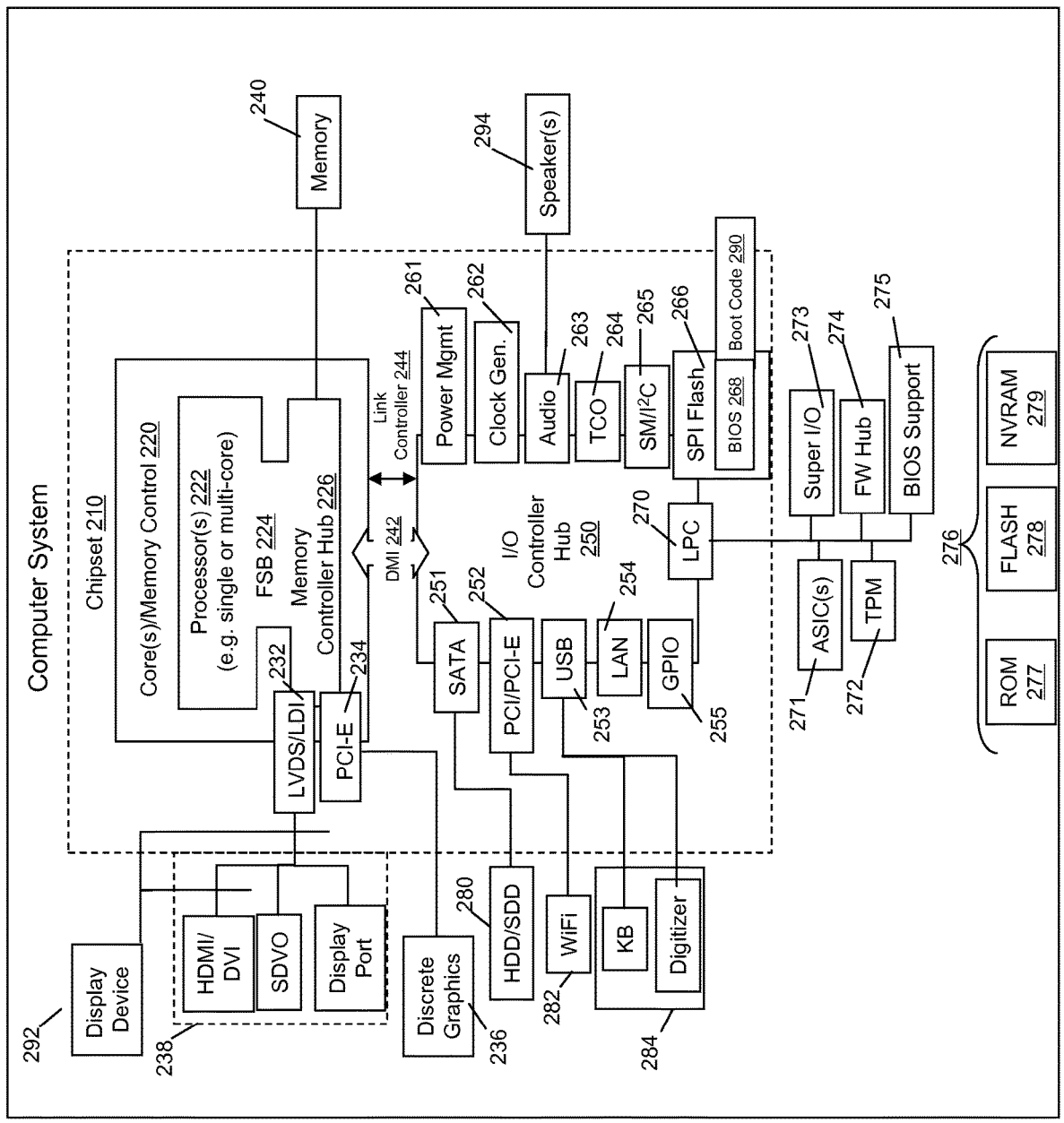
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer for receiving pen input, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices such as tablets, smart phones, personal computer devices generally, and/or other electronic devices. Users may employ these electronic devices for various functions, e.g., inputting pen data as an input modality to an application. For example, the circuitry outlined in FIG. 1 may be implemented in a tablet or smart phone embodiment, whereas the circuitry outlined in FIG. 2 may be implemented in a laptop personal computer embodiment that operates with a pen, e.g., includes a digitizer or touch screen. In each case, the device may include an input surface, e.g., a touch screen or the like, which acts to accept pen input and provides visual displays of input characters, as well as components to detect control key characteristics of the pen input such that control key functionality may be implemented as described herein.

Figure 3:
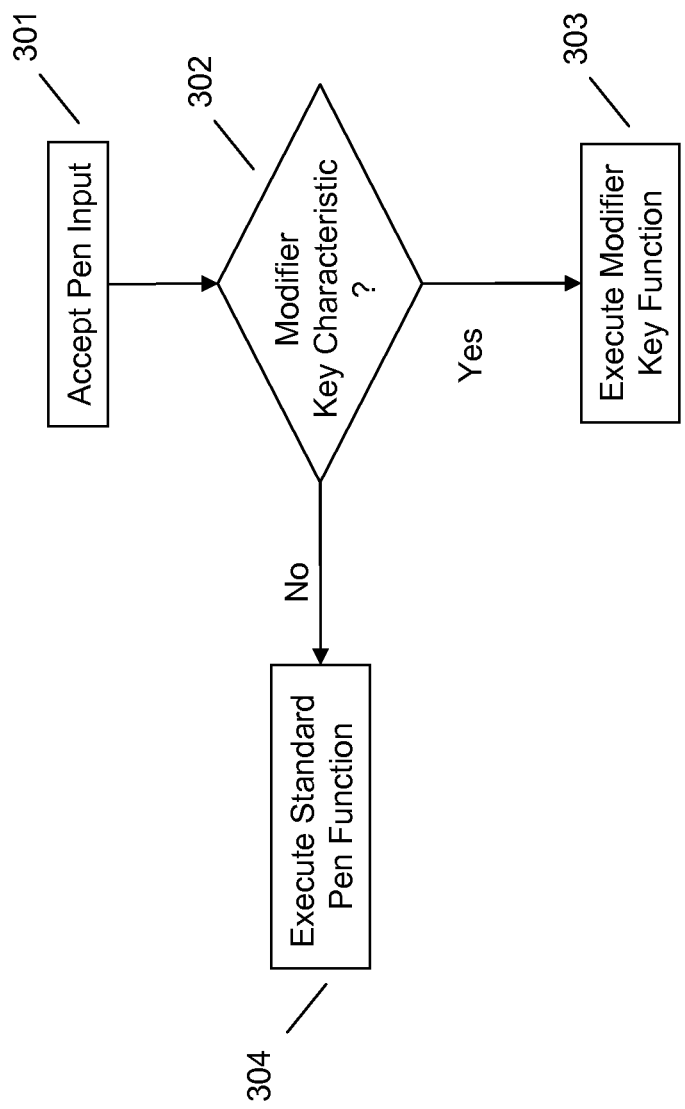
FIG. 3 illustrates an example method of simulating keyboard shortcuts with pen input.

As illustrated in FIG. 3 an embodiment provides a method of simulating keyboard shortcuts with pen input. In the illustrated example, an embodiment accepts a pen input at

301, e.g., at an input surface such as a touch screen display. An embodiment analyzes the pen input to determine at 302 if the pen input includes or is associated with a control key characteristic. If so, an embodiment may implement or execute a corresponding control key function associated with the pen input at 303. e.g., executing a "copy" action if the pen input is associated with a "c" character input. Otherwise, i.e., if no control key characteristic is determined for the pen input at 302, an embodiment may implement a normal or standard pen input function at 304, e.g., inputting handwriting ink strokes, making selections on screen, inputting characters in a text box, etc.

As may be appreciated, a variety of control key characteristics may be detected and utilized to implement different functionality based on the pen input. For example, a determination of a control key characteristic of the pen input may include a determination that the pen input is provided at a certain location. The location may include a location that is not normally associated with the providing of pen input, e.g., an ink stroke provided on top of an on-screen keyboard location. By way of specific example, if a user draws the letter "C" on top of a soft keyboard, rather than in another area of an input method editor (pen interface) dedicated to handwriting input, an embodiment may determine this as a control key characteristic and execute a function associated with the control key, e.g., execute a "Ctrl+C" input in this example.

By way of further example, a control key characteristic may be determined at 302 by determining that a user has touched a soft key with the pen, rather than touching the soft key with his or her hand or finger tip. If such an input is detected, as determined at 302 for example by detecting a pen tip is in contact with the soft key rather than a finger tip, an embodiment may use this as a cue that the user wishes to implement a control key function at 303 (e.g., associated with the key pressed) rather than have a standard key input at 304.

A more explicit control key characteristic may include a physical button press. By way of example, the physical button press may include a pen button press, such as is available on an active pen or stylus. In this way, an embodiment may detect pen input (e.g., to a soft key or the like) while a pen button is pressed or activated, and in turn may use this as a cue that the user is providing a control key input with the pen rather than a standard pen input. Likewise, the physical button press may include a physical keyboard key press. That is, an embodiment may detect that a user is pressing a physical key (e.g., of a detachable or wireless keyboard) using the pen (e.g., as detected via an orientation sensor(s), accelerometer, or other sensor of an active pen). Such detection may be used by an embodiment to determine a control key characteristic, e.g., in the form of simultaneous inputs from the pen and the physical key, and use the same as a cue to implement a control function, e.g., associated with the physical key pressed with the active pen.

An embodiment therefore permits a user drawing a character with a pen button pressed to be determined as a control key characteristic at 302 and thus generate a combination of keys as the input executed. For example, if user presses pen button and draws C, an embodiment generates Ctrl+C event at 303. Alternatively, an embodiment detects pressing a virtual key (e.g., soft key) with a pen rather than with a finger tip, and uses this detection at 302 to implement a control key function at 303. For example, if a user presses "C" on a virtual keyboard with touch, an embodiment generates a "C" character input, whereas if a user presses "C" on a virtual keyboard with a pen, an embodiment generates a "Ctrl+C" event. Alternatively, a smart pen (active pen as opposed to a passive pen or stylus) may be used in combination with a sensor keyboard, which will allow pressing physical buttons with a pen to generate keyboard shortcuts, as described herein.

Another alternative embodiment provides that pen input in dedicated areas (e.g. on top of the "Control" key (or like key) on a virtual keyboard, or within a special "Control" pad, etc.) is determined to be a control key characteristic associated with the pen input, thus causing an embodiment to execute an associated control function (e.g., a copy action).

In an embodiment, a confirmation may be implemented such that a user has the opportunity to confirm that the shortcut (e.g., control key function) was intentional. This may assist users in providing the appropriate inputs, and may prevent users from inadvertently providing control or other shortcut key inputs, e.g., pressing a pen button and writing a shortcut character accidentally. Such confirmation may be optional (configurable), and also may be displayed or indicated only in case of predefined inputs (e.g., destructive or disruptive inputs that might erase text, such as "Ctrl+X," "undo/redo," "Alt+F4," etc.).

In order to reduce CPU, power or resource utilization, latency, etc., and/or to prevent inadvertent shortcut or control input, e.g., when detecting shortcut combinations such as a pen button press and a written character, detection of such control key characteristics may be limited to one or two characters only. If a user is writing a word, for example, such control key characteristic detection may be turned off until the user stops writing momentarily, moves the pen to a different area of the screen, or in some other way provides input indicating that the word is finished and a shortcut/control input detection should be resumed. This will tend to reduce or eliminate shortcut inputs being executed where a user intends to write a word. Also, detection of a control key characteristic by an embodiment may be suppressed, e.g., if a longer input (e.g., more than just one or two characters of pen input) occurs as a consecutive input (within a predetermined time). Such input may be interpreted as a word. Also, such control key characteristic detection may be suppressed if a use context suggests that standard pen input is more likely, e.g., a word is being input (or other standard input is occurring, e.g., scrolling, etc.) as opposed to a control input. For example, if according to a grammar check program an article "a" should be inserted in the current cursor position, but a user presses a pen button by accident and writes "a" with the pen, an embodiment will not detect a control key characteristic and a standard "a" character input will be provided.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accepting, at an input surface, a single pen input at an on-screen keyboard location, wherein the single pen input comprises input provided at a location of the on-screen keyboard other than a modifier soft key and wherein the other than a modifier soft key corresponds to a non-modifier key default function;
determining, using a processor of an electronic device, a control key characteristic of the single pen input corresponding to an attribute of the single pen input, wherein the control key characteristic does not comprise input at a modifier key and wherein the control key characteristic identifies a modification to the non-modifier key default function associated with the other than a modifier soft key of the on-screen keyboard, wherein the attribute is selected from the group consisting of: a location of the single pen input with respect to the on-screen keyboard, a physical button press, and an input device corresponding to the single pen input;
providing a request for confirmation of the modification of the non-modifier key default function, wherein the providing is responsive to determining a modified key function corresponding to the control key characteristic for the other than a modifier soft key comprises a disruptive input; and
executing, responsive to receiving confirmation of the modification and using the processor, a modified key function for the other than a modifier soft key that is different from the non-modifier key default function associated with the other than a modifier soft key based on the single pen input and the control key characteristic.

2. The method of claim 1, wherein the attribute of the single pen input comprises a location of the pen input with respect to the on-screen keyboard.

3. The method of claim 2, wherein the location comprises an on-screen keyboard location.

4. The method of claim 2, wherein the location comprises a soft key.

5. The method of claim 4, wherein the executing comprises executing a control key function associated with the soft key.

6. The method of claim 2, wherein the location comprises a non-handwriting input location.

7. The method of claim 1, wherein the attribute of the single pen input comprises a physical button press.

8. The method of claim 7, wherein the physical button press comprises a pen button press.

9. The method of claim 7, wherein the physical button press comprises a physical keyboard key press.

10. The method of claim 9, wherein the control key characteristic of the single pen input comprises simultaneous detection of the physical keyboard key press and pen movement data.

11. An electronic device, comprising:
an input surface;
a processor operatively coupled to the input surface; and
a memory that stores instructions executable by the processor to:
accept, at the input surface, a single pen input at an on-screen keyboard location, wherein the single pen input comprises input provided at a location of the on-screen keyboard other than a modifier soft key and wherein the other than a modifier soft key corresponds to a non-modifier key default function;
determine a control key characteristic of the single pen input corresponding to an attribute of the single pen input, wherein the control key characteristic does not comprise input at a modifier key and wherein the control key characteristic identifies a modification to the non-modifier key default function associated with the other than a modifier soft key of the on-screen keyboard, wherein the attribute is selected from the group consisting of: a location of the single pen input with respect to the on-screen keyboard, a physical button press, and an input device corresponding to the single pen input;

provide a request for confirmation of the modification of the non-modifier key default function, wherein the providing is responsive to determining a modified key function corresponding to the control key characteristic for the other than a modifier soft key comprises a disruptive input; and execute, responsive to receiving confirmation of the modification, a modified key function for the other than a modifier soft key that is different from the non-modifier key default function associated with the other than a modifier soft key based on the single pen input and the control key characteristic.

12. The electronic device of claim 11, wherein the attribute of the single pen input comprises a location of the single pen input with respect to the on-screen keyboard.

13. The electronic device of claim 12, wherein the location comprises an on-screen keyboard location.

14. The electronic device of claim 12, wherein the location comprises a soft key.

15. The electronic device of claim 14, wherein to execute comprises executing a control key function associated with the soft key.

16. The electronic device of claim 12, wherein the location comprises a non-handwriting input location.

17. The electronic device of claim 11, wherein the attribute of the single pen input comprises a physical button press.

18. The electronic device of claim 17, wherein the physical button press comprises a pen button press.

19. The electronic device of claim 17, wherein the physical button press comprises a physical keyboard key press.

20. A product, comprising:

a storage device having code stored therewith, the code being executable by a processor of an electronic device and comprising:

code that accepts, from an input surface, a single pen input at an on-screen keyboard location, wherein the single pen input comprises input provided at a location of the on-screen keyboard other than a modifier soft key and wherein the other than a modifier soft key corresponds to a non-modifier key default function;

code that determines a control key characteristic of the single pen input corresponding to an attribute of the single pen input, wherein the control key characteristic does not comprise input at a modifier key and wherein the control key characteristic identifies a modification to the non-modifier key default function associated with the other than a modifier soft key of the on-screen keyboard, wherein the attribute is selected from the group consisting of: a location of the single pen input with respect to the on-screen keyboard, a physical button press, and an input device corresponding to the single pen input;

code that provides a request for confirmation of the modification of the non-modifier key default function, wherein the providing is responsive to determining a modified key function corresponding to the control key characteristic for the other than a modifier soft key comprises a disruptive input; and code that executes, responsive to receiving confirmation of the modification, a modified key function for the other than a modifier soft key that is different from the non-modifier key default function associated with the other than a modifier soft key based on the single pen input and the control key characteristic.

* * * * *